(12) United States Patent
Boyle et al.

(10) Patent No.: US 8,560,759 B1
(45) Date of Patent: Oct. 15, 2013

(54) HYBRID DRIVE STORING REDUNDANT COPIES OF DATA ON DISK AND IN NON-VOLATILE SEMICONDUCTOR MEMORY BASED ON READ FREQUENCY

(75) Inventors: William B. Boyle, Lake Forest, CA (US); Curtis E. Stevens, Irvine, CA (US); Virgil V. Wilkins, Perris, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 233 days.

(21) Appl. No.: 12/911,564

(22) Filed: Oct. 25, 2010

(51) Int. Cl.
*G06F 12/00* (2006.01)

(52) U.S. Cl.
USPC ........... 711/101; 711/102; 711/103; 711/203; 711/206; 711/E12.007

(58) Field of Classification Search
None
See application file for complete search history.

(56) References Cited

U.S. PATENT DOCUMENTS

| | | | |
|---|---|---|---|
| 5,333,138 A | 7/1994 | Richards et al. |
| 5,581,785 A | 12/1996 | Nakamura et al. |
| 5,586,291 A | 12/1996 | Lasker et al. |
| 6,044,439 A | 3/2000 | Ballard et al. |
| 6,115,200 A | 9/2000 | Allen et al. |
| 6,275,949 B1 | 8/2001 | Watanabe |
| 6,429,990 B2 | 8/2002 | Serrano et al. |
| 6,661,591 B1 | 12/2003 | Rothberg |
| 6,662,267 B2 | 12/2003 | Stewart |
| 6,687,850 B1 | 2/2004 | Rothberg |
| 6,754,021 B2 | 6/2004 | Kisaka et al. |
| 6,807,630 B2 | 10/2004 | Lay et al. |
| 6,909,574 B2 | 6/2005 | Aikawa et al. |
| 6,968,450 B1 | 11/2005 | Rothberg et al. |
| 7,017,037 B2 | 3/2006 | Fortin et al. |
| 7,028,174 B1 | 4/2006 | Atai-Azimi et al. |
| 7,082,494 B1 | 7/2006 | Thelin et al. |
| 7,107,444 B2 | 9/2006 | Fortin et al. |
| 7,120,806 B1 | 10/2006 | Codilian et al. |
| 7,142,385 B2 | 11/2006 | Shimotono et al. |
| 7,334,082 B2 | 2/2008 | Grover et al. |
| 7,395,452 B2 | 7/2008 | Nicholson et al. |
| 7,411,757 B2 | 8/2008 | Chu et al. |
| 7,461,202 B2 | 12/2008 | Forrer, Jr. et al. |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Alford Kindred
*Assistant Examiner* — Arvind Talukdar (57) ABSTRACT

A hybrid drive is disclosed comprising a head actuated over a disk comprising a plurality of data sectors, and a non-volatile semiconductor memory (NVSM). A read frequency of a first logical block address (LBA) is maintained, and when the read frequency of the first LBA exceeds a threshold and a corresponding PBA is assigned to a data sector of the disk, first data stored in the data sector is copied to a memory segment of the NVSM. When the read frequency of the first LBA exceeds a threshold and the PBA is assigned to a memory segment of the NVSM, first data stored in the memory segment is copied to a data sector of the disk. When a read command is received to read the first LBA, a decision is made to read the first data from one of the NVSM and the disk.

16 Claims, 6 Drawing Sheets

(56) References Cited

U.S. PATENT DOCUMENTS

| | | |
|---|---|---|
| 7,472,222 B2 | 12/2008 | Auerbach et al. |
| 7,477,477 B2 | 1/2009 | Maruchi et al. |
| 7,509,471 B2 | 3/2009 | Gorobets |
| 7,516,346 B2 | 4/2009 | Pinheiro et al. |
| 7,610,438 B2 | 10/2009 | Lee et al. |
| 7,613,876 B2 | 11/2009 | Bruce et al. |
| 7,644,231 B2 | 1/2010 | Recio et al. |
| 7,685,360 B1 | 3/2010 | Brunnett et al. |
| 7,752,491 B1 | 7/2010 | Liikanen et al. |
| 2005/0172067 A1* | 8/2005 | Sinclair ................. 711/103 |
| 2006/0195657 A1 | 8/2006 | Tien et al. |
| 2007/0271413 A1* | 11/2007 | Fujibayashi et al. .......... 711/112 |
| 2008/0040537 A1 | 2/2008 | Kim |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2008/0307270 A1 | 12/2008 | Li |
| 2009/0019218 A1 | 1/2009 | Sinclair et al. |
| 2009/0031072 A1 | 1/2009 | Sartore |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0245049 A1* | 10/2009 | Toda .......................... 369/47.32 |
| 2009/0249168 A1 | 10/2009 | Inoue |
| 2009/0271562 A1 | 10/2009 | Sinclair |
| 2009/0276565 A1* | 11/2009 | Fujibayashi et al. .......... 711/112 |
| 2009/0327603 A1 | 12/2009 | McKean et al. |
| 2010/0079885 A1* | 4/2010 | McKean .......................... 360/15 |
| 2010/0088459 A1 | 4/2010 | Arya et al. |
| 2011/0153931 A1* | 6/2011 | Bell et al. ..................... 711/114 |
| 2012/0066473 A1* | 3/2012 | Tremaine et al. ............. 711/206 |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

* cited by examiner

HYBRID DRIVE STORING REDUNDANT COPIES OF DATA ON DISK AND IN NON-VOLATILE SEMICONDUCTOR MEMORY BASED ON READ FREQUENCY

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figure 1A:
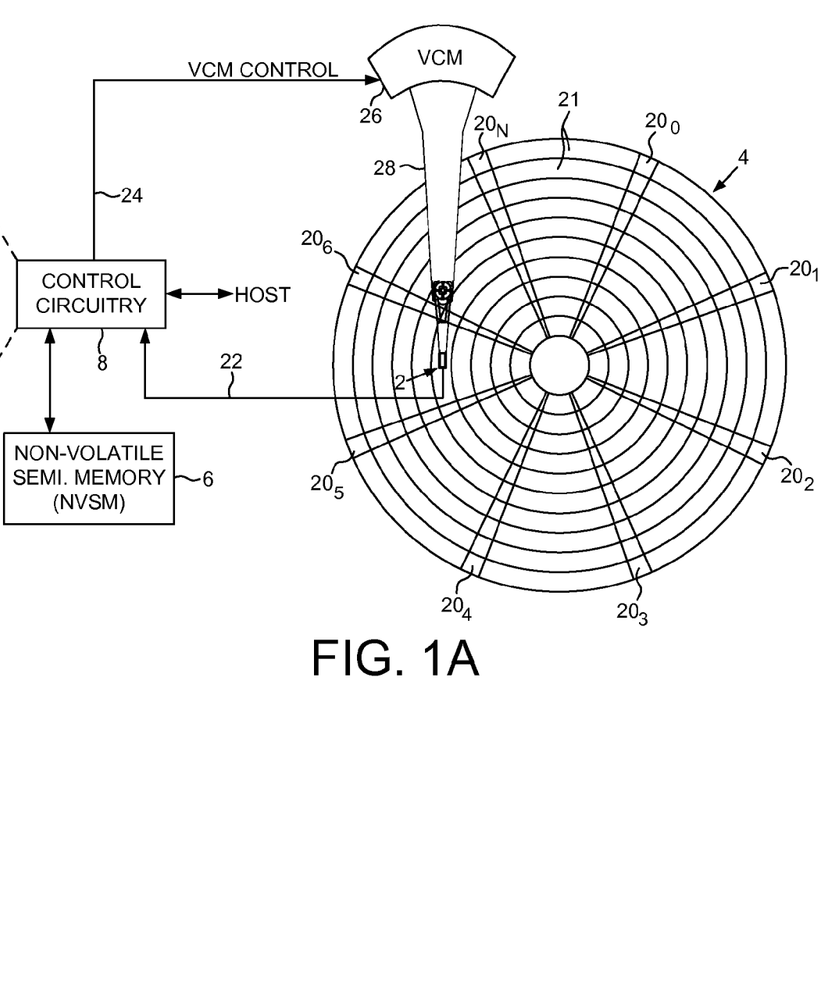
FIG. 1A shows a hybrid drive according to an embodiment of the present invention comprising a head actuated over a disk, and a non-volatile semiconductor memory (NVSM).
Figure 1B:
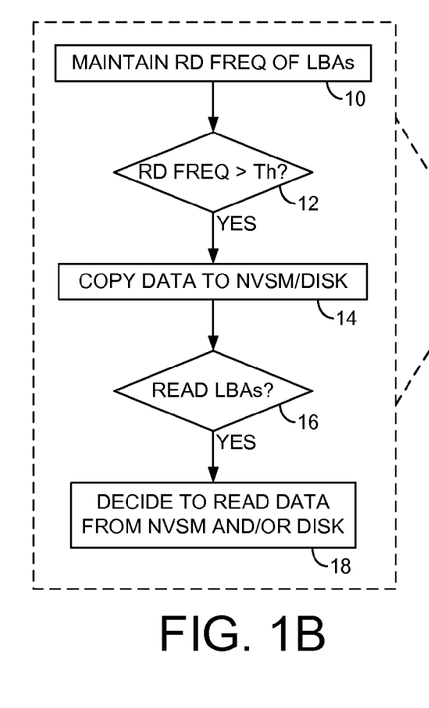
FIG. 1B is a flow diagram according to an embodiment of the present invention wherein when an LBA is read frequently, the data of the LBA is duplicated so that a copy is stored both on the disk and in the NVSM.

FIG. 1A shows a hybrid drive according to an embodiment of the present invention comprising a head 2 actuated over a disk 4 comprising a plurality of data sectors, and a non-volatile semiconductor memory (NVSM) 6 comprising a plurality of memory segments. The hybrid drive further comprises control circuitry 8 operable to execute the flow diagram of FIG. 1B, wherein a read frequency of a first logical block address (LBA) is maintained (step 10), and the first LBA is mapped to a physical block address (PBA). When the read frequency of the first LBA exceeds a threshold (step 12) and the PBA is assigned to a data sector of the disk, first data stored in the data sector is copied to a memory segment of the NVSM (step 14). When the read frequency of the first LBA exceeds a threshold (step 12) and the PBA is assigned to a memory segment of the NVSM, first data stored in the memory segment is copied to a data sector of the disk (step 14). When a read command is received to read the first LBA (step 16), a decision is made to read the first data from one of the NVSM and the disk (step 18).

In the embodiment of FIG. 1A, any suitable NVSM 6 may be employed, such as any suitable electrically erasable/programmable memory (e.g., a flash memory). In one embodiment, the NVSM comprises a plurality of blocks, where each block comprises a plurality of memory segments referred to as pages and each page may store one or more data sectors. The blocks are programmed a page at a time, and an entire block is erased in a unitary operation. In one embodiment, a garbage collection operation may be executed on previously written blocks in order to copy valid pages to new blocks (and/or to the disk) so that the previously written blocks may be erased and re-used.

The disk 4 shown in the embodiment of FIG. 1A comprises a plurality of servo sectors $20_0$-$20_N$ that define data tracks 21, where each data track comprises a plurality of the data sectors. The control circuitry 8 processes a read signal 22 emanating from the head 2 to demodulate the servo sectors $20_0$-$20_N$ into a position error signal (PES) representing a position error of the head relative to a target data track. The control circuitry 8 comprises a servo compensator for filtering the PES to generate a control signal 24 applied to a voice coil motor (VCM) 26 that rotates an actuator arm 28 about a pivot in order to actuate the head 2 radially over the disk 4 in a direction that reduces the PES.

In one embodiment, the data of a frequently read LBA is stored in both a data sector on the disk and in a memory segment of the NVSM which provides at least two benefits. For example, frequently read data is typically more critical data (e.g., operating system data) and therefore storing multiple copies of frequently read data provides redundancy in the event there is a failure when reading from either the NVSM or the disk. In another embodiment described in greater detail below, storing multiple copies of frequently read data may increase throughput of the hybrid drive by allowing data to be read concurrently from both the NVSM and the disk.

Any suitable technique may be employed to determine whether an LBA is read frequently. In one embodiment, the read frequency of an LBA is determined by evaluating how often over a predetermined interval the LBA is read by the host. In another embodiment, the read frequency of an LBA may be determined by evaluating the percentage of read commands that include the LBA relative to a predetermined number of read commands received from the host. For example, if an LBA is read ten times out of the hundred most recent read commands (or any other suitable ratio) it may be considered as frequently read. If the status of an LBA changes over time (e.g., changes back into an infrequently read LBA), the corresponding memory segment of the NVSM may be erased so as to free space in the NVSM, or the memory segment may be marked as erasable to facilitate a wear leveling algorithm that is eventually executed on the NVSM.

Figure 2:
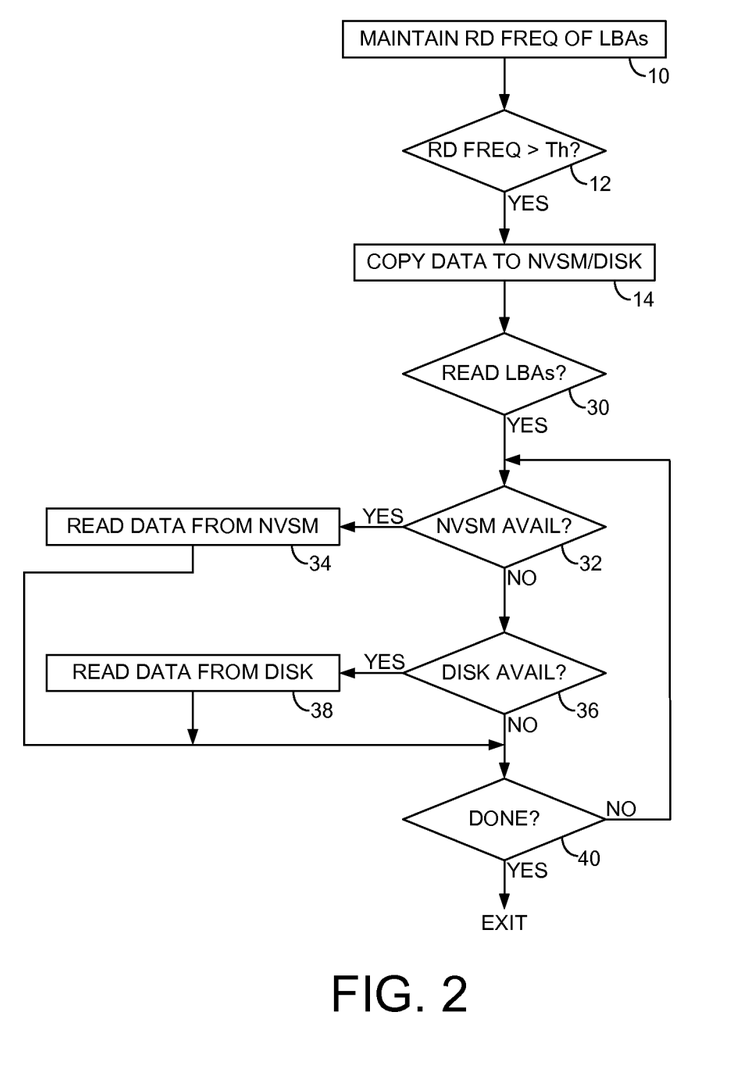
FIG. 2 is a flow diagram according to an embodiment of the present invention wherein when a read command is received to read a plurality of duplicated LBAs, a decision is made to read each LBA from one of the disk or NVSM based on the availability of each channel.

FIG. 2 is a flow diagram according to an embodiment of the present invention wherein when one or more read commands are received to read a number of frequently read LBAs (step 30), the channel selected to read each LBA is selected based on the availability of each channel. If the NVSM is available (step 32), the LBA is read from the NVSM (step 34). If the NVSM is unavailable and the disk is available (step 36), the data is read from the disk (step 38). This process is repeated until all of the LBAs have been read (step 40). One of the channels may be considered unavailable if, for example, the channel is busy servicing a previous access command or performing a background operation such as garbage collection, wear leveling, or write verification. In another embodiment, one of the channels may be considered unavailable if it is in a low power mode (e.g., if the disk is spun down).

In one embodiment, the LBAs in the read commands in FIG. 2 are processed currently using both channels. For example, one or more of the LBAs may be read from the NVSM while concurrently reading one or more of the LBAs from the disk. Each time through the loop of FIG. 2, the channel that finishes reading the previous LBAs is selected to read subsequent LBAs of the same read command or a subsequent read command.

Figure 3A:
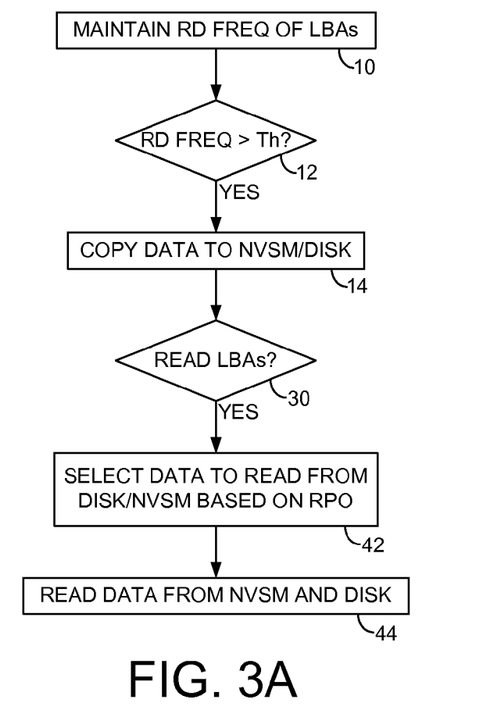
FIGS. 3A and 3B illustrate an embodiment of the present invention wherein the channel selected to read an LBA is based on a rotational position optimization (RPO) algorithm.
Figure 3B:
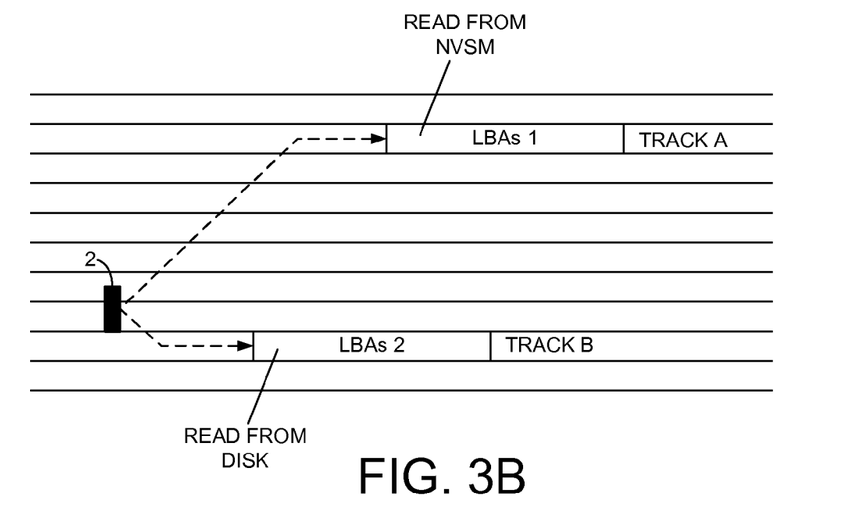

FIGS. 3A and 3B illustrate an embodiment of the present invention wherein the read commands received from the host are stored in a command queue and evaluated using a rotational position optimization (RPO) algorithm in order to select the read commands serviced by the disk and the read command serviced by the NVSM (step 42). The read commands are then executed concurrently (step 44) in order to maximize the throughput of the hybrid drive. FIG. 3B shows an example location of the head 2 relative to the data tracks of the disk 4, and the LBAs of two read commands. Since the head 2 is able reach the read command for the LBAs in track B faster than the LBAs in track A, the LBAs of the read command for track B are selected to be serviced by the disk whereas the LBAs of track A are read from the NVSM. The simple example of FIG. 3B shows only two read commands pending in the command queue; however, the selection criteria may be more sophisticated as more read commands are added to the queue. For example, the RPO algorithm may assign the LBAs to be serviced by the disk and NVSM based on the access latency of executing a sequence of commands in the command queue as well as the bandwidth of each channel. If either channel processes the assigned read commands faster or slower than estimated, the pending read commands may be reassigned to the channel that has more available bandwidth.

Figure 4A:
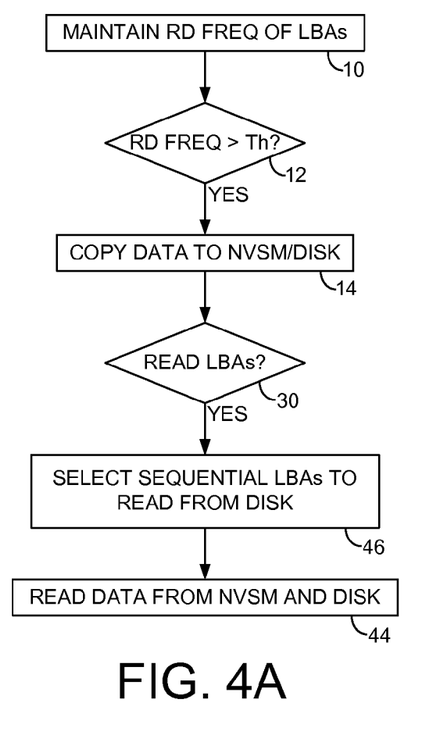
FIGS. 4A and 4B illustrate an embodiment of the present invention wherein the channel selected to read an LBA is based on the sequentiality of LBAs.
Figure 4B:
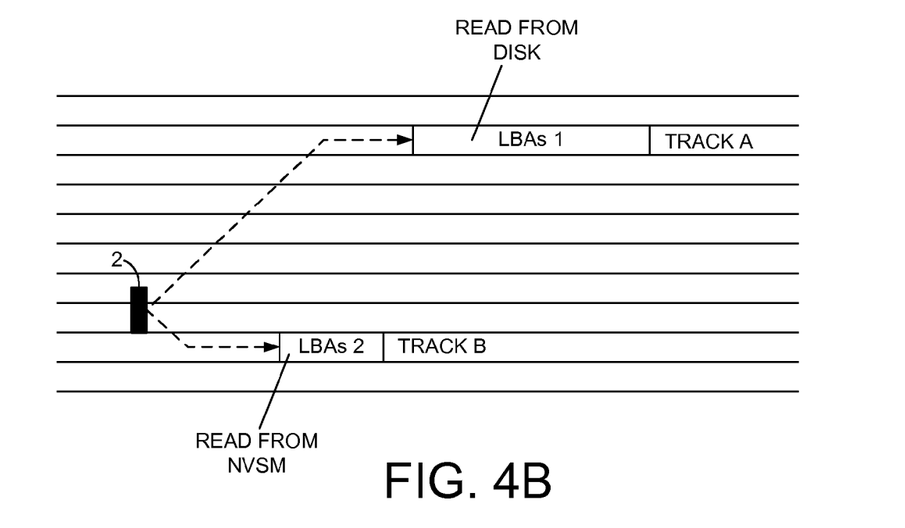

FIGS. 4A and 4B illustrate an embodiment of the present invention wherein the read commands are selected from the command queue to be serviced by the disk and the NVSM based on the sequentiality of the LBAs in the read commands (step 46). The disk is typically more efficient when reading longer sequences of LBAs rather than randomly seeking to read commands having short sequences of LBAs. In the example shown in FIG. 4B, the head 2 may be able to reach the read command having LBAs in track B faster than the read command having LBAs in track A. However, in this example the read command for track A is assigned to the disk since it comprises a longer sequence of LBAs as compared to the read command for track B. In one embodiment, the selection algorithm may consider multiple factors (e.g., access latency, sequentiality, etc.) when assigning read commands to the disk and the NVSM. For example, referring again to the example of FIG. 4B, if the length of sequential LBAs for the read command of track A decreases below a limit, the selection algorithm will assign the read command of track B to the disk.

Figure 5A:
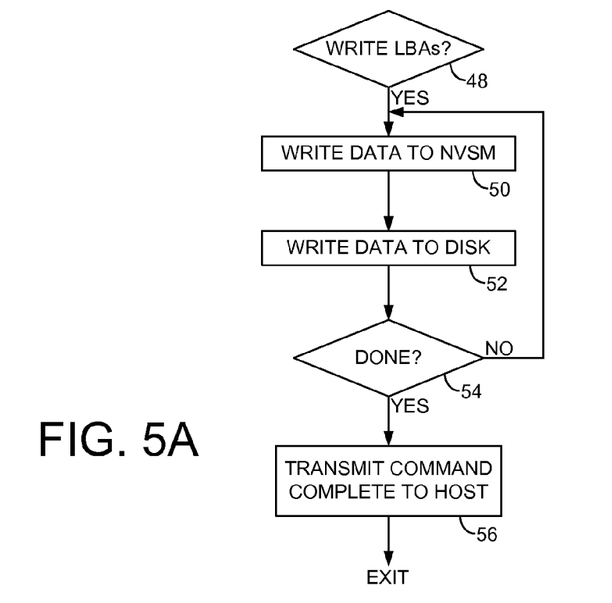
FIG. 5A is a flow diagram according to an embodiment of the present invention wherein when a write command is received to write a frequently read LBA, the data is written to both the disk and the NVSM prior to transmitting a command complete to the host.

FIG. 5A is a flow diagram according to an embodiment of the present invention wherein when a write command is received to write frequently read LBAs (step 48), the data for each LBA is written to the NVSM (step 50) and to the disk (step 52) until all of the LBAs are written to both the NVSM and the disk (step 54). After all of the data has been written to both the NVSM and the disk, a command complete is transmitted to the host (step 56). In one embodiment, the data may be concurrently written to both the NVSM and the disk. In yet another embodiment, the command complete may be transmitted to the host as soon as the data is received and cached in a volatile semiconductor memory (e.g., a DRAM). The data may then be written to both the NVSM and the disk from the DRAM, or written to the NVSM and then later copied from the NVSM to the disk, or written to the disk and then later copied from the disk to the NVSM.

Figure 5B:
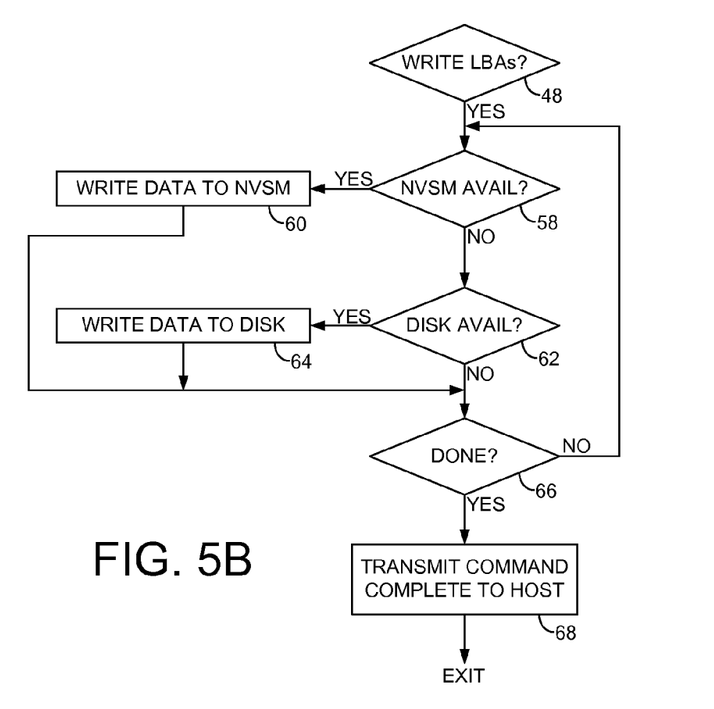
FIG. 5B is a flow diagram according to an embodiment of the present invention wherein when a write command is received to write a frequently read LBA, the data is written to one of the disk and the NVSM prior to transmitting a command complete to the host.

FIG. 5B is a flow diagram according to an embodiment of the present invention wherein when a write command is received to write frequently read LBAs (step 48), and the NVSM is available (step 58), the data is written to the NVSM (step 60). Otherwise if the disk is available (step 62) the data is written to the disk (step 64). The process is repeated until each LBA has been written to one of the NVSM or the disk (step 66). Once the LBAs have been written at least once (to either the NVSM or the disk), a command complete is transmitted to the host (step 68). This embodiment enables the host to transmit subsequent access commands as soon as the data has been written to at least one of the disk or the NVSM. After transmitting the command complete to the host, at a later time the data is copied to either the NVSM or the disk so that a copy of the data is stored on both.

Figure 5C:
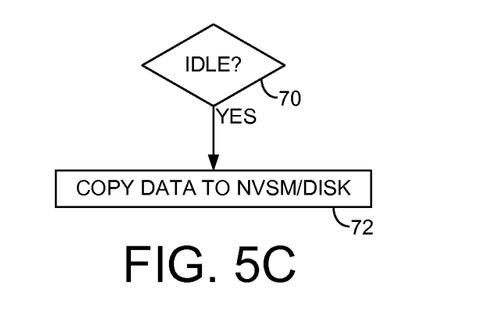
FIG. 5C is a flow diagram according to an embodiment of the present invention wherein data written to a frequently read LBA is copied to the other channel during an idle mode of the hybrid drive.

FIG. 5C is a flow diagram according to an embodiment of the present invention wherein when the hybrid drive enters an idle mode (step 70) the data stored on one of the channels is copied to the other channel (step 72). For example, if data for an LBA is written to the NVSM when servicing a write command, during the idle mode the data is read from the NVSM and copied to the disk. In another embodiment, the data is copied from one channel to the other when servicing a read command. For example, if data for a frequently read LBA is read from the NVSM when servicing a read command and a copy of the data is not yet stored on the disk, the data is written to the disk in connection with servicing the read command.

Figure 5D:
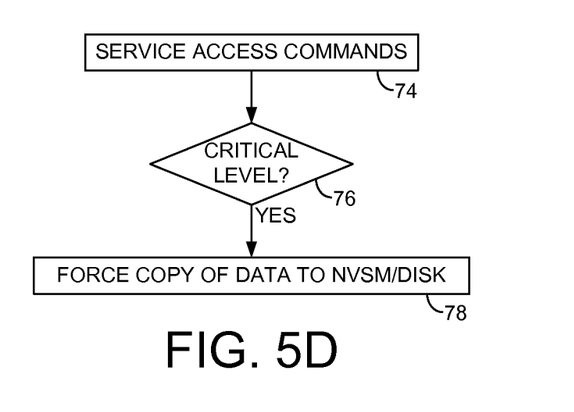
FIG. 5D is a flow diagram according to an embodiment of the present invention wherein data written to a frequently read LBA is copied to the other channel when a criticality metric reaches a limit.

FIG. 5D is a flow diagram according to an embodiment of the present invention wherein if the hybrid drive is servicing a number of access commands (step 74) it may not enter an idle mode. In this embodiment, a criticality metric is evaluated and when it reaches a limit (step 76), a forced copy operation is executed in order to copy the data from one channel to the other (step 78). This embodiment ensures the benefits of storing redundant copies on both the disk and NVSM for frequently read LBAs over high workload intervals. Any suitable criticality metric may be measured at step 76 of FIG. 5D, such as an amount of time after writing the data to one of the channels, or an amount of data that needs to be copied.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk comprising a plurality of data sectors;
   a head actuated over the disk;
   a non-volatile semiconductor memory (NVSM) comprising a plurality of memory segments; and
   control circuitry operable to:
   maintain a read frequency of a first logical block address (LBA), wherein the first LBA is mapped to a physical block address (PBA);
   when the read frequency of the first LBA exceeds a threshold and the PBA is assigned to a data sector of the disk, copy first data stored in the data sector to a memory segment of the NVSM;
   when the read frequency of the first LBA exceeds a threshold and the PBA is assigned to a memory segment of the NVSM, copy first data stored in the memory segment to a data sector of the disk;
   receive a read command to read the first LBA and a second LBA, wherein the second LBA is mapped to a first PBA assigned to a data sector on the disk and to a second PBA assigned to a memory segment of the NVSM; and
   execute a rotational position optimization algorithm (RPO) in order to select the disk for reading the first LBA and the NVSM for reading the second LBA.

2. The hybrid drive as recited in claim 1, wherein the control circuitry is further operable to:
   receive a write command to write second data to the first LBA;
   write the second data to a memory segment of the NVSM; and
   write the second data to a data sector of the disk.

3. The hybrid drive as recited in claim 2, wherein the control circuitry is further operable to write the second data to the memory segment of the NVSM and to the data sector of the disk prior to transmitting a command complete to the host.

4. The hybrid drive as recited in claim 2, wherein the control circuitry is further operable to:
   transmit a command complete to the host after writing the second data to one of the NVSM and the disk; and
   copy the second data to one of the NVSM and the disk after transmitting the command complete to the host.

5. The hybrid drive as recited in claim 4, wherein the control circuitry is further operable to copy the second data from the NVSM to the disk when the disk is available.

6. The hybrid drive as recited in claim 4, wherein the control circuitry is further operable to copy the second data from the disk to the NVSM when the NVSM is available.

7. The hybrid drive as recited in claim 4, wherein the control circuitry is further operable to:
   measure a criticality metric; and
   force the copy when the criticality metric reaches a limit.

8. A method of operating a hybrid drive comprising a head actuated over a disk comprising a plurality of data sectors, and a non-volatile semiconductor memory (NVSM) comprising a plurality of memory segments, the method comprising:
   maintaining a read frequency of a first logical block address (LBA), wherein the first LBA is mapped to a physical block address (PBA);
   when the read frequency of the first LBA exceeds a threshold and the PBA is assigned to a data sector of the disk, copying first data stored in the data sector to a memory segment of the NVSM;
   when the read frequency of the first LBA exceeds a threshold and the PBA is assigned to a memory segment of the NVSM, copying first data stored in the memory segment to a data sector of the disk;
   receiving a read command to read the first LBA and a second LBA, wherein the second LBA is mapped to a first PBA assigned to a data sector on the disk and to a second PBA assigned to a memory segment of the NVSM; and
   executing a rotational position optimization algorithm (RPO) in order to select the disk for reading the first LBA and the NVSM for reading the second LBA.

9. The method as recited in claim 8, further comprising:
   receiving a write command to write second data to the first LBA;
   writing the second data to a memory segment of the NVSM; and
   writing the second data to a data sector of the disk.

10. The method as recited in claim 9, further comprising writing the second data to the memory segment of the NVSM and to the data sector of the disk prior to transmitting a command complete to the host.

11. The method as recited in claim 9, further comprising:
    transmitting a command complete to the host after writing the second data to one of the NVSM and the disk; and
    copying the second data to one of the NVSM and the disk after transmitting the command complete to the host.

12. The method as recited in claim 11, further comprising copying the second data from the NVSM to the disk when the disk is available.

13. The method as recited in claim 11, further comprising copying the second data from the disk to the NVSM when the NVSM is available.

14. The method as recited in claim 11, further comprising:
    measuring a criticality metric; and
    forcing the copy when the criticality metric reaches a limit.

15. A hybrid drive comprising:
    a disk comprising a plurality of data sectors;
    a head actuated over the disk;
    a non-volatile semiconductor memory (NVSM) comprising a plurality of memory segments; and
    control circuitry operable to:
    maintain a read frequency of a first logical block address (LBA), wherein the first LBA is mapped to a physical block address (PBA);
    when the read frequency of the first LBA exceeds a threshold and the PBA is assigned to a data sector of the disk, copy first data stored in the data sector to a memory segment of the NVSM;
    when the read frequency of the first LBA exceeds a threshold and the PBA is assigned to a memory segment of the NVSM, copy first data stored in the memory segment to a data sector of the disk;

receive a read command to read a first plurality of LBAs and a second plurality of LBAs, wherein each LBA is mapped to a first PBA assigned to a data sector on the disk and to a second PBA assigned to a memory segment of the NVSM; and select the disk for reading the first plurality of LBAs and the NVSM for reading the second plurality of LBAs based on a number of sequential LBAs in the first plurality of LBAs.

16. A method of operating a hybrid drive comprising a head actuated over a disk comprising a plurality of data sectors, and a non-volatile semiconductor memory (NVSM) comprising a plurality of memory segments, the method comprising:

maintaining a read frequency of a first logical block address (LBA), wherein the first LBA is mapped to a physical block address (PBA);

when the read frequency of the first LBA exceeds a threshold and the PBA is assigned to a data sector of the disk, copying first data stored in the data sector to a memory segment of the NVSM;

when the read frequency of the first LBA exceeds a threshold and the PBA is assigned to a memory segment of the NVSM, copying first data stored in the memory segment to a data sector of the disk;

receiving a read command to read a first plurality of LBAs and a second plurality of LBAs, wherein each LBA is mapped to a first PBA assigned to a data sector on the disk and to a second PBA assigned to a memory segment of the NVSM; and selecting the disk for reading the first plurality of LBAs and the NVSM for reading the second plurality of LBAs based on a number of sequential LBAs in the first plurality of LBAs.

* * * * *